(12) United States Patent
Lee

(10) Patent No.: US 8,577,985 B2
(45) Date of Patent: *Nov. 5, 2013

(54) LOAD BALANCING AND ADMISSION SCHEDULING IN PULL-BASED PARALLEL VIDEO SERVERS

(75) Inventor: Yiu Bun Lee, Kowloon (HK)

(73) Assignee: The Chinese University of Hong Kong, Hong Kong SAR (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/339,307

(22) Filed: Dec. 28, 2011

(65) Prior Publication Data

US 2012/0102132 A1    Apr. 26, 2012

Related U.S. Application Data

(63) Continuation of application No. 12/849,723, filed on Aug. 3, 2010, now Pat. No. 8,108,480, which is a continuation of application No. 11/857,755, filed on Sep. 19, 2007, now Pat. No. 7,797,391.

(51) Int. Cl.
*G06F 15/16*    (2006.01)

(52) U.S. Cl.
USPC ........... 709/208; 709/203; 709/229; 709/231; 725/86; 725/97

(58) Field of Classification Search
None
See application file for complete search history.

(56) References Cited

U.S. PATENT DOCUMENTS

| | | | |
|---|---|---|---|
| 5,528,513 A * | 6/1996 | Vaitzblit et al. | 718/103 |
| 5,561,456 A * | 10/1996 | Yu | 725/97 |
| 5,829,046 A | 10/1998 | Tzelnic et al. | |
| 6,032,200 A * | 2/2000 | Lin | 710/6 |
| 6,061,504 A | 5/2000 | Tzelnic et al. | |
| 6,119,154 A | 9/2000 | Weaver et al. | |
| 6,163,795 A | 12/2000 | Kikinis | |
| 6,728,270 B1 | 4/2004 | Meggers et al. | |
| 6,747,976 B1 | 6/2004 | Bensaou et al. | |
| 6,925,499 B1 | 8/2005 | Chen et al. | |

(Continued)

FOREIGN PATENT DOCUMENTS

| | | |
|---|---|---|
| CN | 101001365 A | 7/2007 |
| WO | WO 99/29108 A1 | 6/1999 |
| WO | WO 2009/046623 A1 | 4/2009 |

OTHER PUBLICATIONS

International Search Report and Written Opinion of Dec. 18, 2008 for PCT Application No. PCT/CN2008/001628, 7 pages.

(Continued)

*Primary Examiner* — Mohamed Ibrahim
(74) *Attorney, Agent, or Firm* — Kilpatrick Townsend & Stockton LLP; Kenneth R. Allen

(57) ABSTRACT

A pull-based parallel video server system and method of implementation useful in an on-demand video system includes a plurality of slave admission schedulers operating in parallel with a master admission scheduler to back up the master admission scheduler that controls access to an array of pull-based video servers according to a protocol that accounts for jitter and loss of packets, as well as network delays. A transport protocol is provided that improves video data throughput under such conditions. To determine the architecture and functional requirements of the redundant admission schedulers, an analytical tool in the form of a performance model has been developed that incorporates network delays, delay jitters and packet losses on the communication links between the clients, schedulers and servers.

20 Claims, 3 Drawing Sheets

(56) References Cited

U.S. PATENT DOCUMENTS

| | | | |
|---|---|---|---|
| 7,024,681 B1 | 4/2006 | Fransman et al. | |
| 7,287,180 B1 * | 10/2007 | Chen et al. | 714/4.3 |
| 7,324,555 B1 | 1/2008 | Chen et al. | |
| 7,441,261 B2 | 10/2008 | Slater et al. | |
| 7,584,324 B2 | 9/2009 | Zimmerman et al. | |
| 7,797,391 B2 | 9/2010 | Lee | |
| 2001/0000194 A1 | 4/2001 | Sequeira | |
| 2001/0003828 A1 | 6/2001 | Peterson et al. | |
| 2002/0013864 A1 | 1/2002 | Dandrea et al. | |
| 2003/0037331 A1 | 2/2003 | Lee | |
| 2009/0077246 A1 | 3/2009 | Lee | |
| 2010/0318602 A1 | 12/2010 | Lee | |

OTHER PUBLICATIONS

International Preliminary Report on Patentability of Mar. 24, 2010 for PCT Application No. PCT/CN2008/001628, 4 pages.

Lee, Jack Y.B., "Performance Analysis of a Pull-Based Parallel Video Server", IEEE Transactions on Parallel and Distributed Systems, Dec. 2000, vol. 11, No. 12, pp. 1217-1231.

Lee, Jack Y.B., "Parallel Video Servers: A Tutorial", IEEE Multimedia, Jun. 1998, vol. 5, No. 2, pp. 20-28.

Notice of Allowance of Oct. 26, 2011 for U.S. Appl. No. 12/849,723, 11 pages.

Non-Final Office Action of Jul. 19, 2011 for U.S. Appl. No. 12/849,723, 16 pages.

Non-Final Office Action of Feb. 4, 2011 for U.S. Appl. No. 12/849,723, 21 pages.

Notice of Allowance of Jun. 21, 2010 for U.S. Appl. No. 11/857,755, 8 pages.

Non-Final Office Action of Dec. 3, 2009 for U.S. Appl. No. 11/857,755, 12 pages.

* cited by examiner

⊖⊖⊖ No admission scheduling (AS)
✕✕✕ w/ AS
+++ w/ AS and delay
▱▱▱ w/ AS, delay & loss
–◇– w/ AS, delay, loss, & FT

LOAD BALANCING AND ADMISSION SCHEDULING IN PULL-BASED PARALLEL VIDEO SERVERS

CROSS-REFERENCES TO RELATED APPLICATIONS

This application is a continuation of U.S. patent application Ser. No. 12/849,723 filed Aug. 3, 2010, now U.S. Pat. No. 8,108,480, which is a continuation of U.S. patent application Ser. No. 11/857,755 filed Sep. 19, 2007, now U.S. Pat. No. 7,797,391.

STATEMENT AS TO RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to video data server technology and more specifically to video on demand systems based on parallel server architectures and related methods for implementation. Most specifically, the invention relates to load balancing and admission scheduling in pull-based parallel video servers.

Pull-based parallel video server configurations have been studied and described, as for example, Jack Y. B. Lee, "Parallel. Video Servers—A Tutorial," *IEEE Multimedia*, vol. 5(2), June 1998, pp. 20-28, and Jack Y. B. Lee, and P. C. Wong, "Performance Analysis of a Pull-Based Parallel Video Server," *IEEE Trans. on Parallel and Distributed Systems*, vol. 11(12), December 2000, pp. 217-231. These configurations are not to be confused with the server-push service model, as for example described in the literature by W. J. Bolosky, J. S. Barrera, III, R. P. Draves, R. P. Fitzgerald, G. A. Gibson, M. B. Jones, S. P. Levi, N. P. Myhrvold, R. F. Rashid, "The Tiger Video Fileserver," *Proc. of the Sixth International Workshop on Network and Operating System Support for Digital Audio and Video*. IEEE Computer Society, Zushi, Japan, April 1996; M. M. Buddhikot, and G. M. Parulkar, "Efficient Data Layout, Scheduling and Playout Control in MARS," *Proc. NOSSDAV '95*, 1995; and M. Wu, and W. Shu, "Scheduling for Large-Scale Parallel Video Servers," *Proc. Sixth Symposium on the Frontiers of Massively Parallel Computation*, October 1996, pp. 126-133.

The following is Table 1, a table with notations and typical numerical values used for evaluation hereinafter:

| Symbol | Description | Value |
| --- | --- | --- |
| $N_S$ | Number of servers | 8 |
| $N_C$ | Number of clients | 80 |
| Q | Video stripe size | 65536 bytes |
| $L_C$ | Number of client buffers | n/a |
| $T_{avg}$ | Average inter-request generation time | 0.437 s |
| $T_{DV}$ | Maximum deviation for request generation time interval | 0.29 s |
| $T_{round}$ | Round time for the admission scheduler | 3.495 s |
| $N_{slot}$ | Number of slots in the admission scheduler | 80 |
| $T_{slot}$ | Length of an admission scheduler slot | 0.0437 s |
| $d_A$ | Variable for client-scheduler delay | n/a |
| $D_A$ | Average client-scheduler delay | 0.05 s |
| $D_A^+, D_A^-$ | Jitter bounds for client-scheduler delay | 0.005 s |
| $d_S$ | Variable for client-server delay | n/a |
| $D_S$ | Average client-server delay | 0.05 s |
| $D_S^+, D_S^-$ | Jitter bounds for client-server delay | 0.005 s |
| $T_{out}^A, T_{out}^S$ | Retransmission timeout threshold for the client-scheduler, and client-server control paths | 0.11 s |
| $N_{retx}^A, N_{retx}^S$ | Maximum number of retransmissions for the client-scheduler, and client-server control paths | 3 |
| $\rho_A, \rho_S$ | Packet loss probability for the client-scheduler and client-server control paths | $10^{-2}$ |
| $\beta$ | Maximum tolerable packet loss probability for control paths | $10^{-6}$ |
| $D_{PA}^+, D_{PS}^+$ | Delay jitter bounds due to retransmission in the client-scheduler and client-server control paths | 0.22 s |
| $N_A$ | Number of replicated admission schedulers | n/a |
| $D_F$ | Maximum delay in detecting a scheduler failure | n/a |
| $T_{hb}$ | Time interval for periodic heartbeat packets | n/a |
| $N_{hb}$ | Maximum number of consecutive lost packets to declare scheduler failure | 5 |
| $D_{max}$ | Maximum service delay at the video servers | n/a |

A parallel video server has multiple independent servers connected to client hosts by an interconnection network. The interconnection network can be implemented using packet switches such as FastEthernet or ATM switches. Each server has separate CPU, memory, disk storage, and network interface. The so-called share-nothing approach ensures that the scalability of the system will not be limited by resource contention. Through the interconnection network (e.g. a packet switch) a client retrieves video data from each server block by block and re-sequences the video data for playback. The number of servers in a system may be denoted by $N_S$ and the number of clients by $N_C$.

The principle behind parallel video server architecture is the striping of a video title across all servers in a system. A server's storage space may be divided into fixed-size stripe units of Q bytes each. Each video title is then striped into blocks of Q bytes and stored into the servers in a round-robin manner as shown in FIG. 2. The fixed-size block striping algorithm is called "space striping" in Lee, "Parallel Video Servers—A Tutorial," cited above, as opposed to striping in units of video frames, called "time striping." Since a stripe unit in space striping is significantly smaller than a video title (kilobytes versus megabytes), this enables fine-grain load sharing among servers. Hereafter, the invention will be described in terms of space striping.

The use of parallelism at the server level not only breaks through the capacity limit of a single server but also enables the use of redundancy to achieving server-level fault tolerance. Unlike server replication and data partitioning, in a parallel scheme a video title to be made available is divided into small units and then distributed over servers in a parallel video server in a technique called server striping. Video data units of a video title are then retrieved from the servers according to a striping policy (space and/or time) for delivery to clients over a communication network.

As a video title is distributed across all servers in the system, one must first retrieve video blocks from the corresponding servers and then merge them back into a single video stream before submitting to the client for playback. In general, the video data merging process (called a proxy) can be implemented in the server (proxy-at-server), in a separate computer (independent proxy), or at the client computer (proxy-at-client). Hereinafter, the system described employs a proxy-at-client architecture. The choice is two-fold: (a) lower cost—no additional inter-server data transfer (proxy-at-server) or additional hardware (independent proxy) is needed; and (b) better fault tolerance—failure of the proxy affects only the client running at the same computer.

The term "service model" refers to the way in which video data are scheduled and delivered to a client. There are two common service models: client pull and server push. In the client-pull model, a client periodically sends requests to a server to retrieve video data. In this model, the data flow is driven by the client. In the server-push model, the server schedules the periodic retrieval and transmission of video data once a video session has started.

In the client-pull service model, each request sent from a client is served at the server independently of all other requests. Hence, the servers need not be clock-synchronized, since synchronization is implicit in the client requests. Hereafter, it is assumed that the client-pull service model is used. Without loss of generality, it will be assumed a client sends request i (i≥0) to server mod(i,$N_S$). Each request will trigger the server to retrieve and transmit Q bytes of video data.

An issue in parallel video server Video on Demand systems not found in conventional single-server Video on Demand systems is known as load balancing. While the server striping of video titles over the servers using small stripe size ensures that the average load is balanced, the instantaneous load at the servers may vary due to randomness in the system. This instantaneous load imbalance can temporarily degrade the server's performance and cause video playback interruptions at the client.

In order to better understand the invention, it is helpful to consider an analytical model of the request generation process in a pull-type service-based system. A portion of this model was previously developed by the inventor and reported in "Performance Analysis of a Pull-Based Parallel Video Server," cited above. Assuming the system uses a credit-based flow control algorithm to manage the data flow from the servers to the client, the client maintains $L_C$ buffers (each Q bytes) of video data to absorb system delay variations. Before playback starts, the client will first pre-fetch the first ($L_C$−1) buffers, and then request one more video block whenever the head-of-line video block is submitted to the video decoder for playback.

Assuming the video client generates requests with an average inter-request time interval of $T_{avg}$ seconds, then to account for variations in the request-generation process, let $T_{DV}$ be the maximum deviation for the process such that the time span between any k consecutive requests is bounded by $$\max\{((k-1)T_{avg}-T_{DV}),0\} \leq t \leq ((k-1)T_{avg}+T_{DV}) \quad (1)$$

Since a client generates requests to the $N_S$ servers in a round-robin manner, the corresponding time span between any k consecutive requests sending to the same server can be obtained from $$\max\{((k-1)N_S T_{avg}-T_{DV}),0\} \leq t \leq ((k-1)N_S T_{avg}+T_{DV}) \quad (2)$$

With this request-generation model, it can be shown that:

Theorem 1 Assume n clients generating requests independently and each client sends requests to the $N_S$ servers in the system in a round-robin manner, then the minimum time for a server to receive k video data requests is given by $$T_{Request}^{min}(k,n) = \max\left\{\left(\left\lceil \frac{k}{n} \right\rceil - 1\right)N_S T_{avg} - T_{DV}, 0\right\} \quad (3)$$

Regardless of the number of servers in the system, Theorem 1 shows that a server can receive up to n requests simultaneously ($T_{Request}^{min}(k,n)=0$) if multiple clients happen to be synchronized. This client-synchrony problem has been previously shown to severely limit the scalability of the system.

To prevent instantaneous load imbalance, an admission scheduler is used to explicitly schedule the start times of new video sessions to avoid synchrony. Previously, the inventor with others proposed a staggering scheme as depicted in the first line (a) of FIG. 3 (Prior Art) for use in the admission scheduler. The scheduler maintains an admission map of length $T_{round}$ seconds and is divided into $N_{slot}$ slots of length $$T_{slot}=T_{round}/N_{slot} \quad (4)$$

(in seconds)

Each time slot has two states: free or occupied. When a client wants to start a new video session, it will first send a request to the scheduler. Ignoring processing delays and assuming the request arrives at the scheduler at time t, the scheduler will admit the new session if and only if the time slot n is free, where n is given by:

$$n=\lceil \mathrm{mod}(t,T_{round})/T_{slot}\rceil \quad (5)$$

This is illustrated in the second line (b) of FIG. 3B (Prior Art).

To admit a new session, the scheduler will send a response back to the client when slot n begins and mark the corresponding time slot as occupied until the session terminates. Conversely, if the requested time slot is already occupied, the scheduler will wait (effectively increasing t) until a free time slot is available, as illustrated in the third line (c) of FIG. 3 (Prior Art). With the setting of $T_{round}=N_S T_{avg}$, one derives the worst-case load in Theorem 2 below.

Theorem 2 If the admission scheduler is used with parameters $T_{round}=N_S T_{avg}$ and there are n clients, then the minimum time for a server to receive k video data requests is given by $$T_{Request}^{min}(k,n) = \begin{cases} \max\{uN_S T_{avg} - T_{DV}, 0\}, & \mathrm{mod}(k,n)=1 \\ \max\{uN_S T_{avg} - T_{DV} + vT_{slot}, 0\}, & \text{otherwise} \end{cases} \quad (6)$$

where $u = \lfloor (k-1)/n \rfloor$, and $v = \mathrm{mod}(k-1,n)$.

Comparing Theorem 1, the requests are spread out by the admission scheduler so that the worst-case load is substantially reduced.

A key performance measure of a pull-based VoD system is service delay at the video server, denoted by $D_{max}$. Service delay is defined as the time from the server receiving a client request to the time the requested video block is completely transmitted. This service delay determines the amount of buffer needed at the client to ensure video playback continuity. As the service delay generally increases with the number of concurrent video sessions, it effectively imposes a limit on the maximum number of concurrent video sessions supportable by the system. Given the disk model, network model, and the bounds in Theorem 2, an upper bound for the service delay can be derived. This maximum service delay is used to evaluate the performance of the system under different parameters.

It has been shown previously that a admission scheduler can effectively prevent instantaneous load imbalance and allow the system to scale up to a large number of servers. However, there were two assumptions: (a) there is no network delay; and (b) there is no packet loss in delivering control messages. The model heretofore described and taken from the inventor's prior work in "Performance Analysis of a Pull-Based Parallel Video Server," cited above, does not incorporate the effect of network delay and delay jitter, and to consider packet loss.

A problem not considered in the prior model developed by the inventor is packet loss in the client-scheduler link, as well as in the client-server link. While packet loss is relatively infrequent in today's high-speed networks, it still cannot be ignored. First, losing control packets between a client and the scheduler will render the system's state inconsistent. For example, if the admission-accept request sent from the scheduler to a client is lost, the client may have to wait a complete schedule period of $N_S T_{avg}$ before discovering the packet lost, since in the worst case, the admission scheduler may indeed need to delay the admission of a new session due to the staggering requirement. Meanwhile, the assigned time slot will be occupied for the same duration even the client never starts the video session. Consequently, new admission requests may be rejected even if the system is running below capacity. Second, losing control packets in the client-server link will result in missing video blocks since the server only sends video data upon receiving a client request. Therefore the control path for both client-scheduler link and client-server link must be reliable.

To tackle the packet-loss problem, one may use a reliable transport protocol to carry control packets. However, unlike conventional data applications, the choice of the transport protocol could have a significant impact on the system's performance. To see why, consider using TCP as the transport protocol for the client-scheduler link. If packet loss occurs, the TCP protocol will time out and retransmit the packet until either it is correctly delivered, or the link is considered to have failed. Since most transport protocols (including TCP) make use of adaptive algorithms to dynamically adjust the timeout threshold, the timeout will be increased substantially if multiple retransmissions are needed.

In practice, the worst-case delay introduced by such transport protocols could go up to tens of seconds. Comparing the average network delay (in milliseconds), the worst-case load at a server will be increased significantly if such transport protocol is used for carrying control traffic.

It has been determined that instantaneous load imbalance can occur and significantly hamper the performance of a pull-type parallel video system. An admission scheduler is critical for maintaining instantaneous load balance across servers in the system, it can also become a single-point-of-failure of the entire system. An architecture and supporting processes are therefore needed to avoid points of failure and performance degradation in pull-based architectures.

SUMMARY OF THE INVENTION

According to the invention, a pull-based parallel video server system and method of implementation useful in an on-demand video system includes a plurality of slave admission schedulers operating in parallel with a master admission scheduler to back up the master admission scheduler that controls access to an array of pull-based video servers according to a protocol that accounts for jitter and loss of packets, as well as network delays. A transport protocol is provided that improves video data throughput under such conditions.

To determine the architecture and functional requirements of the redundant admission schedulers, an analytical tool in the form of a performance model has been developed that incorporates network delays, delay jitters and packet losses on the communication links between the clients, schedulers and servers. This model is an extension of a previous model developed by the inventor and reported in "Performance Analysis of a Pull-Based Parallel Video Server," cited above.

The invention will be better understood upon reference to the following detailed description in connection with the accompanying drawings.

DESCRIPTION OF SPECIFIC EMBODIMENTS OF THE INVENTION

Figure 1:
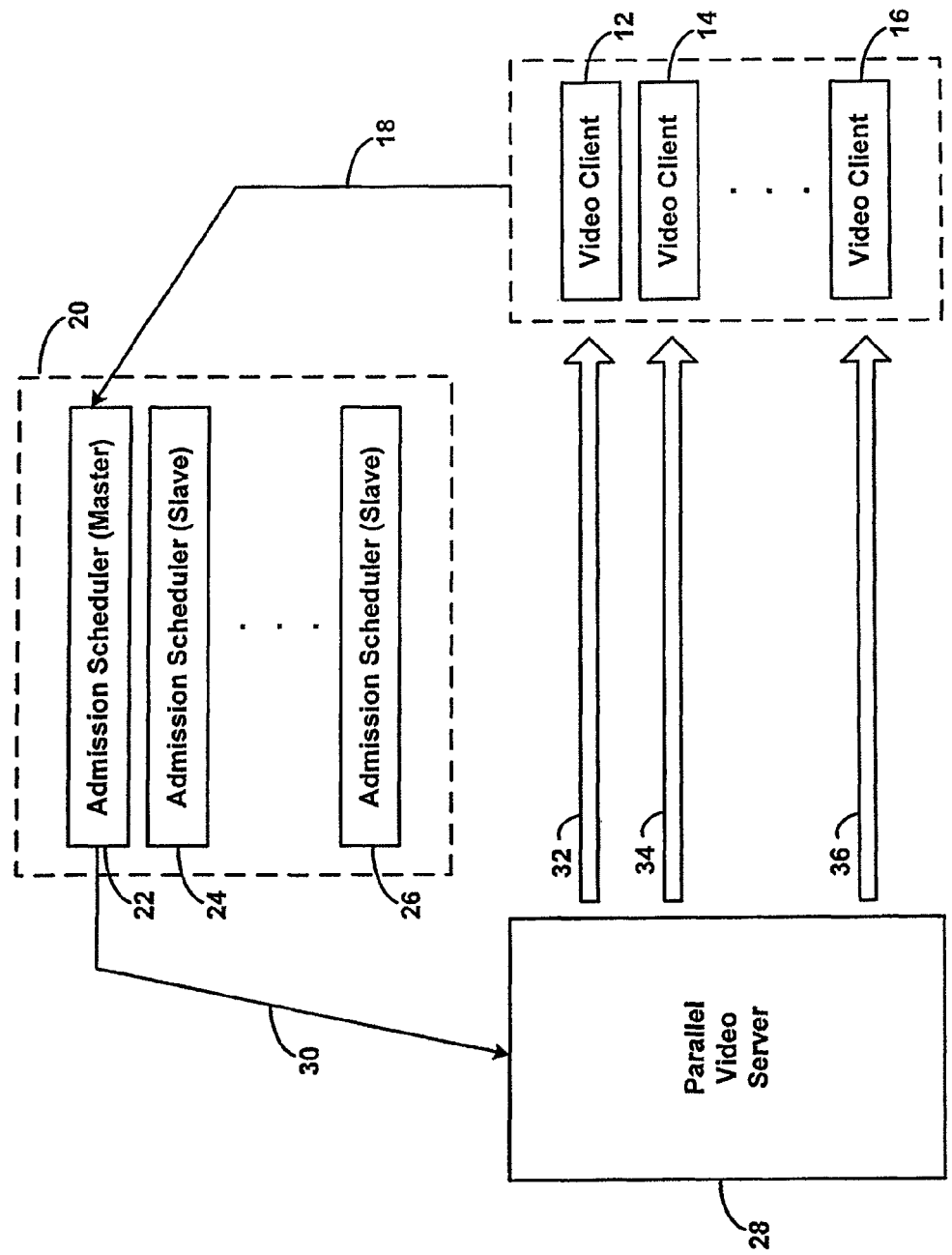
FIG. 1 is a block diagram of a system according to the invention and operative according to the method of the invention.
Figure 2:
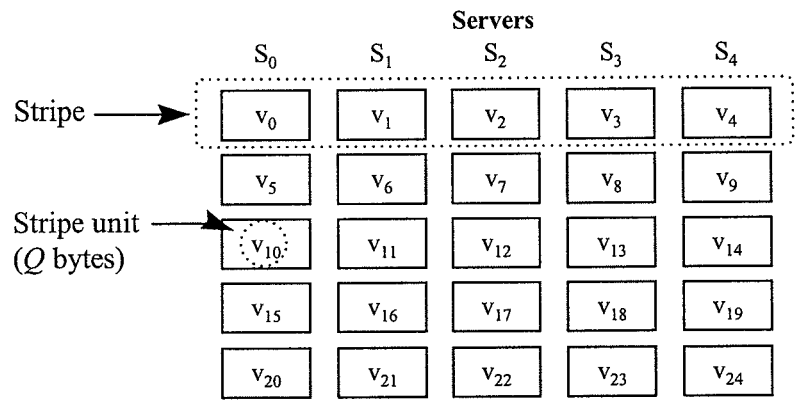
FIG. 2 is an illustration of video striping for a five server-based parallel video server system in accordance with one prior art convention.
Figure 3:
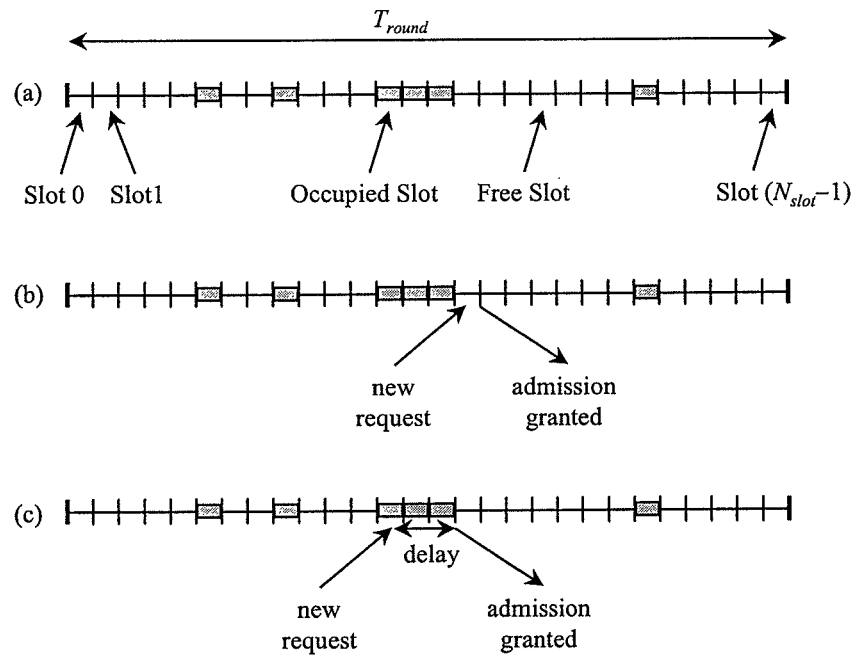
FIG. 3 is a timing chart illustrating three operations of a video scheduler based on prior art techniques, namely, (a) an admission scheduler layout with period $T_{round}$ and $N_{slot}$ admission slots; (b) immediately granting a new video session if the requested slot is free; and (c) delaying a new video session until a free slot is available.

FIG. 1 is a block diagram of a Video on Demand system 10 according to the invention and operative according to the method of the invention and illustrating a replicated admission scheduler. Typically large numbers of video clients 12, 14, 16 are connected via one or more communication links 18 to a collection 20 of admission schedulers 22, 24, 26, one of which is designated as a master admission scheduler 22 and the others being designated as slave admission schedulers 24, 26. The master admission scheduler 22 is connected to a collection of parallel video servers 28 via a communication link 30 and sets up an admission map (which is replicated independently in each of the slave admission schedulers 24, 26) used to control the streaming video output via communication channels 32, 34, 36 to respective video clients 12, 14, 16. The admission schedulers multicast among one another via communication links (not shown), as hereinafter explained.

Under the replication scheme as depicted in FIG. 1, $N_A$ identical admission schedulers 22, 24, 26 are operated concurrently. Each admission scheduler 22, 24, 26 runs in a separate computing node with the goal to keep the system operational so long as at least one of the admission schedulers 22, 24 or 26 remains functional.

Figure 4:
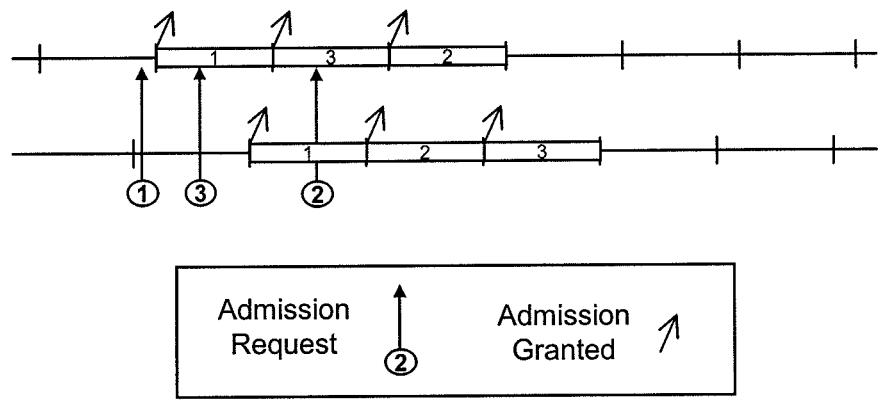
FIG. 4 is a timing chart for two admission schedulers illustrating how a slot assignment inconsistency due to clock jitter can occur in the prior art.

Since there is more than one admission scheduler, co-ordination of the client-scheduler communications is imperative. A first attempt might be to let the client send requests to all $N_A$ schedulers simultaneously and start the session once a reply from any one of the schedulers comes back. However, this approach could result in state inconsistency among the admission schedulers if the client-scheduler link delay is not constant or the clocks of the schedulers are not synchronized. FIG. 4 illustrates this problem using two admission schedulers and three clients. The specific ordering of the requests together with clock-jitter among the schedulers leads to the inconsistent slot assignments at the two schedulers, as the admission requests produce admission grants that are out of order compared to one another.

To solve this problem, according to the invention, a scheme is employed wherein only one admission scheduler is in active control at any one time. The master admission scheduler 22 is responsible for updating the states in the other slave schedulers 24, 26 by periodically multicasting via communication links 38, 40 the updated state information (the admission map). There are three key components in this scheme: (a) a heartbeat protocol to detect scheduler failure; (b) an election procedure to dynamically elect a new master scheduler in case the current one fails; and (c) a bootstrap protocol for the client to locate the master scheduler during client station initialization. Each of these components is discussed hereinafter To advance the utility of the admission scheduler model associated with the foregoing theorems and illustrated in the prior figures, the following extensions supported by theorems are herewith disclosed.

Letting $D_A$ be the average network delay between the client and the admission scheduler, to account for variations in network delay, we assume that the delay jitter is bounded by $D_A^+$ and $D_A^-$ such that the actual delay, denoted by $d_A$, is guaranteed to be $$(D_A+D_A^-) \leq d_A \leq (D_A+D_A^+) \quad (7)$$

This additional delay affects the start time of a video session because the admission reply from the scheduler is subjected to this delay before arriving at the client. In particular, the video client will start sending the first video request $d_A$ seconds after the time the scheduler grants the admission.

Similarly, letting $D_S$ be the average network delay between a client and the video servers, and $D_S^+$, $D_S^-$ be the corresponding delay jitters, then the actual delay, denoted by $d_S$, is guaranteed to be $$(D_S+D_S^-) \leq d_S \leq (D_S+D_S^+) \quad (8)$$

This extra delay adds variations to the time requests arrival at the servers.

In practice, these delays and delay jitters can be determined a priori if the network (e.g. ATM) provide quality-of-service guarantee. Otherwise, it can be estimated experimentally by benchmarking.

Due to client-server link delay and delay jitter, the request-generation time is not the same as the time the request arrives at the server. Since the client-server link delay is jitter bounded, it can be shown that the time for k requests sent from the same client to arrive at a server is bounded by $$\max\{((k-1)N_S T_{avg} - T_{DV} - (D_S^+ - D_S^-)), 0\} \leq t \leq ((k-1) N_S T_{avg} + T_{DV} + (D_S^+ - D_S^-)) \quad (9)$$

Incorporating this and the start-time variations due to client-scheduler link delay jitter, Theorem 3 below extends Theorem 2 to establish the lower bound for the time span of k requests arriving at a server:

Theorem 3 Given the network delay jitters: $D_A^+$, $D_A^-$, $D_S^+$, and $D_S^-$, the minimum time for a server to receive k video data requests from n clients is given by $$T_{Request}^{min}(k, n) = \quad (10)$$

$$\begin{cases} \max\{uN_S T_{avg} - T_{DV} - (D_S^+ - D_S^-), 0\}, & \mod(k, n) = 1 \\ \max\{uN_S T_{avg} - (D_A^+ - D_A^-) - T_{DV} - (D_S^+ - D_S^-) + vT_{slot}, 0\}, & \text{otherwise} \end{cases}$$

where $u = \lfloor (k-1)/n \rfloor$, and $v = \mod(k-1, n)$.

Knowing the worst-case load at a server, one can derive various performance metrics, including maximum service delay at the servers and client buffer requirement at the clients.

To avoid unnecessary delay incurred during packet loss, transport protocols are needed that are both reliable and yet time-sensitive, so that incurred delay will not be excessive. Since the delay jitters are bounded, the timeout limit actually need not be adaptive.

Instead of using complex adaptive timeout-and-retransmit algorithms, a simple yet efficient Reliable Datagram Protocol (RDP) is used that has programmable timeout-and-retransmit parameters. Specifically, the protocol uses a constant timeout limit of $T_{out}$, and a maximum number of retransmissions $N_{retx}$, both configured by the application during system initialization. The timeout thresholds can be chosen according to the delay and delay jitters in the client-scheduler link and the client-server link:
client-scheduler link and the client-server link:

$$\begin{cases} T_{out}^A = 2(D_A + D_A^+) \\ T_{out}^S = 2(D_S + D_S^+) \end{cases} \quad (11)$$

where $T_{out}^A$ and $T_{out}^S$ are the timeout thresholds for the client-scheduler link and the client-server link respectively. Similarly, we can choose the maximum number of retransmissions according to a desired maximum loss probability $\beta$:

$$\begin{cases} (\rho_A)^{N_{retx}^A} \leq \beta \\ (\rho_S)^{N_{retx}^S} \leq \beta \end{cases} \quad (12)$$

where $\rho_A$ and $\rho_S$ are the packet loss probability for the client-scheduler link and the client-server link respectively. Rearranging one can then obtain the required parameters:

$$\begin{cases} N_{retx}^A \geq (\ln\beta / \ln\rho_A) \\ N_{retx}^S \geq (\ln\beta / \ln\rho_S) \end{cases} \quad (13)$$

Under the RDP, the maximum delay incurred by the protocol (i.e. excluding network delay) is bounded by $T_{out}(N_{retx}-1)$. Since RDP will not incur any additional delay if no retransmission takes place, the incurred delay can be incorporated as additional delay jitter of $$\begin{cases} D_{PA}^+ = T_{out}^A (N_{retx}^A - 1) \\ D_{PS}^+ += T_{out}^S (N_{retx}^S - 1) \end{cases} \quad (14)$$

in addition to $D_A^+$ and $D_A^-$. Hence one can extend Theorem 3 to incorporate the new delay jitters:

Theorem 4 Given the delay jitters due to packet loss in (14), the minimum time for a server to receive k video data requests from n clients is given by $$T_{Request}^{min}(k, n) = \qquad (15)$$
$$\begin{cases} \max\{uN_S T_{avg} - T_{DV} - (D_S^+ - D_S^- + D_{PS}^+), 0\}, & \mod(k, n) = 1 \\ \max\{uN_S T_{avg} - (D_A^+ - D_A^- + D_{PA}^+) - T_{DV} - (D_S^+ - D_S^- + D_{PS}^+) + vT_{slot}, 0\}, & \text{otherwise} \end{cases}$$

where $u = \lfloor (k-1)/n \rfloor$, and $v = \mod(k-1, n)$.

According to the invention, a heartbeat protocol is implemented. Each replicated admission scheduler multicasts a heartbeat packet to all other schedulers every $T_{hb}$ seconds via communication links (not shown). If $N_{hb}$ consecutive heartbeat packets are not received from a certain scheduler 22, it will be considered to have failed. Ignoring network delay, all the other schedulers 24, 26 will discover a scheduler failure after a maximum delay of $$D_F = T_{hb} N_{hb} \qquad (16)$$

The master scheduler's heartbeat packet is different from the slave scheduler's heartbeat packet in two ways. First, it contains a bit-vector recording the current state of the admission map. The slave schedulers 24, 26, upon receiving this bit-vector, update their admission maps to synchronize with the master scheduler 22. Second, a heartbeat packet is generated whenever a state change occurs in the admission map. Hence the heartbeat interval can be shorter than $T_{hb}$.

Each scheduler 22, 24, 26 maintains a list of functional admission schedulers. Assuming each scheduler runs on a separate computer with a unique IP address, the list can be composed using the scheduler's IP addresses and sorted by treating the four-byte IP address as an unsigned integer. Based on the heartbeat protocol, failed schedulers will be removed from the list while new (and repaired) schedulers will be inserted into the list. This list is used to elect new master scheduler as discussed herein below. The following shows the pseudo codes for the heartbeat protocol.

Pseudo Codes for Heartbeat Protocol
State Variables:
  AdmissionMap—a bit vector capturing the state of the admission map
  FunctionalSchedulers—list of functional schedulers

```
Procedure_Generate_Heartbeats(T_hb)
{
  while (system running) {
    if admission scheduler is Master then
      Multicasts a heartbeat packet containing AdmissionMap;
    else
      Multicasts a heartbeat packet w/o AdmissionMap
    Sleep(Thb);
  }
}
Procedure_Receive_Heartbeat(scheduler i)
{
  if scheduler i is not in FunctionalSchedulers then
    add scheduler i to FunctionalSchedulers;
  if scheduler i is Master then
    Update AdmissionMap;
}
Procedure_Detect_Scheduler_Failure( )
{
  while (system running) {
    for each scheduler in FunctionalSchedulers {
      if no heartbeats received for D_F seconds then
      {
        remove scheduler from FunctionalSchedulers;
```

```
      if scheduler is Master then run Procedure_Election( )
      }
    }
  }
}
```

If a slave scheduler fails, no action needs to be taken because only the master scheduler 22 is used for admission. All functional schedulers merely record the failure after failing to receive $N_{hb}$ consecutive heartbeat packets from the failed scheduler.

Conversely, an election procedure must be initiated if the master scheduler 22 fails. Since every slave scheduler maintains a list of functional schedulers, the one at the top of the list will be elected as the new master scheduler. This election procedure requires no data exchange between the schedulers. The new master scheduler will then broadcast a message to all schedulers, as well as to all clients, to notify them of the election result. The election procedure occurs only when a master-scheduler failure is detected. Hence, if a failed scheduler comes back online, it will not be elected back as the master scheduler until the current master scheduler fails. The following shows the pseudo codes for the election procedure:

Pseudo Codes for Election Procedure
State Variables:
  AdmissionMap—a bit vector capturing the state of the admission map
  FunctionalSchedulers—list of functional schedulers

```
Procedure_Election( )
{
  New_master = scheduler at the top of FunctionalSchedulers;
  if myself is New_master then
    Multicast election result and AdmissionMap to all schedulers
}
```

While active clients 12, 14, 16 always know which is the current master scheduler by listening to the scheduler's broadcast messages, a newly initialized client (e.g. after power-up or reset) does not know which scheduler is the master scheduler. In this case, the client uses a bootstrap protocol to locate the current master scheduler. Specifically, the newly activated client first obtains the list of IP addresses for all schedulers 22, 24, 26 using the Domain Name System (DNS). This can be done by associating all the scheduler's IP addresses with a single host name (e.g. admission.xxx.com). With this list, the client then sends a query message to the scheduler on the top of the list to ask for the address of the current master scheduler. The process ends when a reply comes back to the client. Otherwise, the client tries the second scheduler in the list and so on until a reply comes back. As long as at least one of the schedulers is functional, the client will be able to locate the current master scheduler and initiate new video sessions. The following shows the pseudo codes for this bootstrap protocol.

Pseudo Codes for Bootstrap Protocol
State Variables:
　AdmissionMap—a bit vector capturing the state of the admission map
　FunctionalSchedulers—list of functional schedulers
　ListOfAllSchedulers—List of all schedulers, operational or not.

```
Procedure_Bootstrap_Request( )
{
  Obtain ListOfAllSchedulers from DNS;
  For each scheduler in ListOfAllSchedulers
  {
    Send query to scheduler to request address of current Master;
    if no reply from scheduler after a time Tout then next scheduler;
    if received reply from scheduler then
    {
      update AdmissionMap and FunctionalSchedulers;
      exit;
    }
  }
}
Procedure_Bootstrap_Reply( )
{
  While (system running)
  {
    Wait for bootstrap request message;
    Reply address of Master, AdmissionMap, and FunctionalSchedulers;
  }
}
```

The replication scheme according to the invention can affect the load balance of the system in two ways. First, since each scheduler runs in a separate computer, their internal clocks are not precisely synchronized. Assuming that a clock-synchronization protocol is used to maintain the clock jitter between any two schedulers to within a maximum of $D_C$ seconds, then when the master scheduler fails and the newly elected master scheduler takes over, the start times of the existing clients will be offset by at most $D_C$ seconds relative to the new master scheduler's clock. This jitter can be incorporated into the inventive system model as follows:

Theorem 5 Given the scheduler's maximum clock jitter $D_C$, the minimum time for a server to receive k video data requests from n clients is given by $$T_{Request}^{min}(k, n) = \qquad (17)$$
$$\begin{cases} \max\{uN_S T_{avg} - T_{DV} - (D_S^+ - D_S^- + D_{PS}^+ + D_C), 0\}, & \mod(k, n) = 1 \\ \max\{uN_S T_{avg} - (D_A^+ - D_A^- + D_{PA}^+) - T_{DV} - (D_S^+ - D_S^- + D_{PS}^+ + D_C) + vT_{slot}, 0\}, & \text{otherwise} \end{cases}$$

where $u = \lfloor (k-1)/n \rfloor$, and $v = \mod(k-1, n)$.

Although the master scheduler multicasts a heartbeat packet for every update to the admission map, the packet may still be lost. If the master scheduler fails, the update will not be propagated to some of the slave schedulers. Assuming that no more than $(N_{hb}-1)$ consecutive heartbeat packets are lost if the scheduler is functional, then the admission map of the master scheduler and the slave schedulers can differ by at most $(N_{hb}-1)$ slots. These slots could be assigned to two clients in case of a master-scheduler failure. It can be shown that Equation (17) can be extended to account for this state inconsistency as follows:

$$T_{Request}^{min}(k, n, N_{hb}) = \begin{cases} T_{Request}^{min}(\lceil k/2 \rceil, n), & \text{if } 0 \le k \le 2(N_{hb}-1) \\ T_{Request}^{min}(k - N_{hb} + 1, n), & \text{if } k > 2(N_{hb}-1). \end{cases} \qquad (18)$$

Equation (18) accounts for the case of one scheduler failure only—which should be sufficient for most practical purposes. It can be extended to account for multiple schedulers failures using similar derivations, if such possibility is non-negligible.

Figure 5:
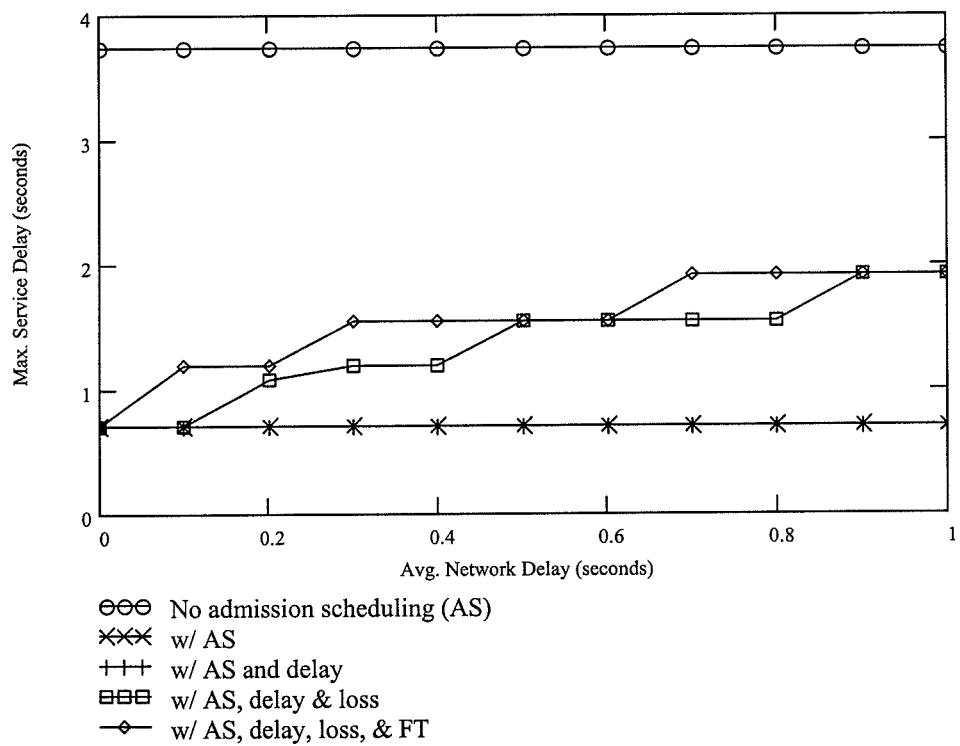
FIG. 5 is a graph in time comparing maximum service delay versus average network delay with and without admission scheduling.

To be practical, the system and techniques associate with the invention cannot have a maximum service delay so large that the system becomes effectively unresponsive to the end-user, the video client. Three seconds is considered an acceptable maximum service delay. The basic parameters are recited in connection with Table 1, above. FIG. 5 is an example of the result of an evaluation showing comparison of maximum service delay versus network delay with a jitter of +/−10%. For comparison purposes, a maximum service delay without an admission scheduler is also charted. Further evaluation under various scenarios of maximum service delay versus packet loss, versus maximum scheduler clock jitter and versus scheduler failure clock jitter has yielded a maximum service delay of no more than 1.2 seconds based on the parameters of Table 1.

The invention has been explained with reference to specific embodiments. Other embodiments will be evident to those of ordinary skill in the art. It is therefore not intended that the invention be limited, except by reference to the language of the appended claims.

What is claimed is:

1. A system comprising:
　a first admission scheduler, coupled in parallel with at least one second admission scheduler configured to back up the first admission scheduler, the first admission scheduler configured to:
　schedule an initiation of requested video sessions at a plurality of parallel video servers to prevent synchrony at the plurality of parallel video servers, and
　periodically multicast an admission map to the at least one second admission scheduler, wherein the admission map comprises a schedule of the initiation of requested video sessions at the plurality of parallel video servers.

2. The system of claim 1, wherein the first admission scheduler is a master admission scheduler and the at least one second admission scheduler is at least one slave admission scheduler.

3. The system of claim 2, wherein the at least one second admission scheduler is configured to dynamically elect a new master admission scheduler in response to a failure of the first admission scheduler.

4. The system of claim 1, wherein the first admission scheduler is configured to multicast the admission map in a heartbeat packet generated in response to a state change of the admission map.

5. The system of claim 4, wherein the heartbeat packet includes at least one bit representing a current state of the admission map.

6. The system of claim 1, wherein the system is configured to use a Reliable Datagram Protocol (RDP) that has a configurable timeout parameter and a configurable retransmit parameter.

7. The system of claim 6, wherein the configurable timeout parameter and the configurable retransmit parameter are preselected according to a function that prevents a maximum service delay from equaling or exceeding a predetermined amount of time.

8. The system of claim 1, wherein the first admission scheduler and the at least one second admission scheduler are configured to:
receive from a client a query message requesting an address of a master admission scheduler; and
send the address of the master admission scheduler to the client in response to the query message.

9. A method, comprising:
receiving, at a master admission scheduler coupled in parallel with at least one slave admission scheduler that backs up the master admission scheduler, requests to initiate video sessions for receiving video data;
scheduling, via the first admission scheduler, initiation of the video sessions at a plurality of parallel video servers to avoid synchrony at the plurality of parallel video servers; and
periodically multicasting an admission map from the master admission scheduler to the at least one slave admission scheduler, wherein the admission map comprises a schedule of the initiation of video sessions at the plurality of parallel video servers.

10. The method of claim 9, further comprising communicating via a Reliable Datagram Protocol (RDP) that has preselectable timeout and retransmit parameters.

11. The method of claim 10, further comprising preselecting the preselectable timeout and retransmit parameters such that maximum service delay to a computing device does not exceed a predetermined threshold.

12. The method of claim 9, further comprising electing, according to an election protocol, a new master admission scheduler from the at least one slave admission scheduler in response to a failure of the master scheduler.

13. The method of claim 9, further comprising:
maintaining, by the master scheduler, the admission map.

14. The method of claim 9, wherein the periodically multicasting the admission map comprises transmitting a heartbeat packet that is generated in response to a state change in the admission map.

15. The method of claim 9, wherein the periodically multicasting the admission map comprises multicasting a bit vector recording a current state of the admission map.

16. The method of claim 9, further including:
receiving from a client a query message requesting an address of the master admission scheduler; and
sending the address of the master admission scheduler to the client in response to receiving the query message.

17. A device comprising:
non-transitory computer-readable medium having instructions stored thereon, wherein said instructions, in response to execution by a computing device, cause the computing device to perform one or more operations, said instructions comprising:
receiving, at a master admission scheduler coupled in parallel with at least one slave admission scheduler that backs up the master admission scheduler, requests to initiate video sessions for receiving video data;
scheduling, via the first admission scheduler, initiation of the video sessions at a plurality of parallel video servers to avoid synchrony at the plurality of parallel video servers; and
periodically multicasting an admission map from the master admission scheduler to the at least one slave admission scheduler, wherein the admission map comprises a schedule of the initiation of video sessions at the plurality of parallel video servers.

18. The device of claim 17, said instructions further comprising electing, according to an election protocol, a new master admission scheduler from the at least one slave admission scheduler in response to a failure of the master scheduler.

19. An apparatus, comprising:
means for receiving, by a first means for scheduling admission coupled in parallel with at least one second means for scheduling admission that backs up the first means for scheduling admission, requests to initiate video sessions for receiving video data;
means for scheduling, by the first means for scheduling admission, initiation of the video sessions at a plurality of parallel video serving means to avoid synchrony at the plurality of parallel video serving means; and
means for periodically multicasting an admission map from the first means for scheduling admission to the at least one second means for scheduling admission, wherein the admission map comprises a schedule of the initiation of video sessions at the plurality of parallel video serving means.

20. The apparatus of claim 19, wherein the first means for scheduling admission includes master means for scheduling admission and the at least one second means for scheduling admission includes at least one slave means for scheduling admission.

* * * * *